(12) United States Patent
Hackbarth et al.

(10) Patent No.: US 12,546,416 B1
(45) Date of Patent: Feb. 10, 2026

(54) TOOTHED GRIPPER WITH VARIABLE HEIGHT TEETH

(71) Applicant: Mueller International, LLC, Atlanta, GA (US)

(72) Inventors: Jason Michael Hackbarth, Chattanooga, TN (US); Ryan Fairchild Larson, Decatur, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 18/795,272

(22) Filed: Aug. 6, 2024

(51) Int. Cl.
*F16L 21/06* (2006.01)
*F16L 37/091* (2006.01)

(52) U.S. Cl.
CPC ........... *F16L 21/065* (2013.01); *F16L 37/091* (2013.01)

(58) Field of Classification Search
CPC ..... F16L 25/06; F16L 25/065; F16L 37/0842; F16L 37/091; F16L 37/092; F16L 37/0925; F16L 37/0927; F16L 37/123; F16L 17/04; F16L 17/03; F16L 17/032; F16L 21/065
See application file for complete search history.

(56) References Cited

U.S. PATENT DOCUMENTS

| | | |
|---|---|---|
| 1,861,372 A | 5/1932 | Waters |
| 1,979,255 A | 11/1934 | Engel et al. |
| 2,037,084 A | 4/1936 | Moore |
| 2,148,038 A | 2/1939 | Raybould |
| 2,501,943 A | 3/1950 | Jack |
| 2,615,741 A | 10/1952 | Nathan |
| 2,693,374 A | 11/1954 | Wurzburger |
| 3,384,392 A | 5/1968 | Gilchrist |
| 3,484,123 A | 12/1969 | Van Der Velden |
| 3,510,140 A | 5/1970 | Hermann |
| 3,684,322 A | 8/1972 | Kotsakis |
| 3,787,080 A | 1/1974 | Daniel |
| 3,889,989 A | 6/1975 | Legris |
| 3,986,730 A | 10/1976 | Martelli et al. |
| 3,986,731 A | 10/1976 | Dehoff |
| 4,230,157 A | 10/1980 | Larsen et al. |

(Continued)

FOREIGN PATENT DOCUMENTS

| | | |
|---|---|---|
| FR | 697255 | 1/1931 |
| FR | 2830070 | 3/2003 |
| KR | 101828783 | 2/2018 |

OTHER PUBLICATIONS

Furcoiu, Aurelian Ioan; Applicant-Initiated Interview Summary for U.S. Appl. No. 16/386,627, filed Apr. 17, 2019, mailed Feb. 7, 2022, 2 pgs.

(Continued)

*Primary Examiner* — Aaron M Dunwoody
(74) *Attorney, Agent, or Firm* — Taylor Duma LLP

(57) ABSTRACT

The present invention discloses a gripper comprising a gripper body with an inner surface defining a tooth plane. The gripper includes a front tooth extending from the tooth plane with a front height, a middle tooth extending from the tooth plane with a middle height, and a back tooth extending from the tooth plane with a back height. The front height is equal to the back height, while the middle height is less than either the front height or the back height. This unique gripper configuration enhances gripping efficiency and stability in various applications requiring precise handling and manipulation.

19 Claims, 8 Drawing Sheets

(56) References Cited

U.S. PATENT DOCUMENTS

| | | | |
|---|---|---|---|
| 4,602,793 | A | 7/1986 | Andrick |
| 4,867,488 | A | 9/1989 | Jones |
| 5,207,459 | A | 5/1993 | Glover |
| 5,297,826 | A | 3/1994 | Percebois et al. |
| 5,476,290 | A | 12/1995 | Bergmann et al. |
| 6,019,396 | A | 2/2000 | Saito et al. |
| 6,220,635 | B1 | 4/2001 | Mtel et al. |
| 6,371,530 | B1 | 4/2002 | Sato et al. |
| 9,441,771 | B2 | 9/2016 | German |
| 11,566,732 | B2 | 1/2023 | Furcoiu et al. |
| 11,808,386 | B2 | 11/2023 | Furcoiu |
| 11,920,706 | B2 | 3/2024 | Furcoiu et al. |
| 2004/0232699 | A1 | 11/2004 | Jones |
| 2005/0040645 | A1 | 2/2005 | Jones |
| 2010/0253074 | A1* | 10/2010 | Gershkovich ....... F16L 37/0926 285/321 |
| 2011/0210543 | A1 | 9/2011 | German et al. |
| 2013/0193685 | A1 | 8/2013 | Bird et al. |
| 2017/0184226 | A1 | 6/2017 | Cuvo et al. |
| 2018/0306361 | A1 | 10/2018 | Furcoiu |
| 2020/0071915 | A1* | 3/2020 | Furcoiu ................ F16L 21/03 |
| 2020/0248848 | A1 | 8/2020 | Furcoiu |
| 2020/0332933 | A1 | 10/2020 | Furcoiu et al. |
| 2020/0370686 | A1 | 11/2020 | Furcoiu et al. |
| 2023/0132678 | A1 | 5/2023 | Furcoiu et al. |
| 2024/0159336 | A1 | 5/2024 | Furcoiu et al. |

OTHER PUBLICATIONS

Furcoiu, Aurelian Ioan; Non-Final Office Action for U.S. Appl. No. 16/386,627, filed Apr. 17, 2019, mailed Nov. 17, 2021, 24 pgs.
Furcoiu, Aurelian Ioan; Notice of Allowance for U.S. Appl. No. 16/386,627, filed Apr. 17, 2019, mailed Sep. 29, 2022, 10 pgs.
Furcoiu, Aurelian Ioan; Restriction Requirement for U.S. Appl. No. 16/386,627, filed Apr. 17, 2019, mailed Mar. 16, 2021, 5 pgs.
Mueller Co; Brochure for The AquaGrip System, revised Mar. 2018, 4 pgs.
The Ford Meter Box Company, Inc.; Product Announcement for The Ford Uni-Ring, published Jun. 2018, 1 pg.
The Ford Meter Box Company, Inc.; Specification Sheet for MJ Gripping Style Restraint—(FUR-C-x-I style), published Feb. 7, 2019, 1 pg.
The Ford Meter Box Company, Inc.; Specification Sheet for MJ Gripping Style Restraint—(FUR-C-x-RB-I style), published Feb. 6, 2019, 1 pg.
Furcoiu, Aurelian Ioan; Non-Final Office Action for U.S. Appl. No. 16/990,384, filed Aug. 11, 2020, mailed Apr. 12, 2023, 42 pgs.
Furcoiu, Aurelian Ioan; Notice of Allowance for U.S. Appl. No. 16/990,384, filed Aug. 11, 2020, mailed Jul. 24, 2023, 12 pgs.
Furcoiu, Aurelian Ioan; Requirement for Restriction/Election for U.S. Appl. No. 16/990,384, filed Aug. 11, 2020, mailed Oct. 5, 2022, 6 pgs.
Furcoiu, Aurelian Ioan; Non-Final Office Action for U.S. Appl. No. 18/146,681, filed Dec. 27, 2022, mailed Jun. 7, 2023, 20 pgs.
Furcoiu, Aurelian Ioan; Notice of Allowance for U.S. Appl. No. 18/146,681, filed Dec. 27, 2022, mailed Oct. 19, 2023, 17 pgs.
Furcoiu, Aurelian Ioan; Non-Final Office Action for U.S. Appl. No. 18/417,973, filed Jan. 19, 2024, mailed Sep. 30, 2024, 26 pgs.
Furcoiu, Aurelian Ioan; Final Office Action for U.S. Appl. No. 16/386,627, filed Apr. 17, 2019, mailed Jun. 16, 2022, 22 pgs.
Furcoiu, Aurelian Ioan; Non-Final Office Action for U.S. Appl. No. 18/417,973, filed Jan. 19, 2024, mailed Apr. 14, 2025, 11 pgs.

* cited by examiner

TOOTHED GRIPPER WITH VARIABLE HEIGHT TEETH

TECHNICAL FIELD

This disclosure relates to joining elements of pipe systems. In particular, this disclosure relates to mechanical joint restraint assemblies for joining pipe elements within a pipe system.

BACKGROUND

A mechanical joint can join a pipe length to a piping element, such as a valve configured to open and close; a fitting such as a tee, an elbow, or a coupling; or another pipe length. In some aspects, the mechanical joint can comprise a female socket, a housing, a gasket, and the pipe length.

The mechanical joint is popular because it can work with a plain end of the pipe length, unlike a grooved or flanged connection, which must generally be formed with special tooling. Using the plain end as-is allows for the pipe length to be cut to size in a field installation without the time and field equipment necessary to weld a flange to the plain end or to cut or roll a new groove in the plain end. Mechanical joints can generally be assembled with common hand tools such as a wrench or ratchet but can sometimes be assembled incorrectly and require time-consuming measuring and marking of the pipe length to ensure a correct insertion depth.

SUMMARY

It is to be understood that this summary is not an extensive overview of the disclosure. This summary is exemplary and not restrictive, and it is intended to neither identify critical elements of the disclosure nor delineate the scope thereof. The sole purpose of this summary is to explain and exemplify certain concepts of the disclosure as an introduction to the following complete and extensive detailed description.

In one aspect, disclosed is a gripper, comprising: a gripper body defining an inner surface that defines a tooth plane; a front tooth extending from the tooth plane and defining a front height; a middle tooth extending from the tooth plane and defining a middle height; and a back tooth extending from the tooth plane and defining a back height, wherein the front height equals the back height and the middle height is less than either the front height or the back height.

In a further aspect, disclosed is a gripper assembly, comprising: a first gripper assembly comprising a plurality of grippers, each gripper comprising a gripper body defining a tooth plane and comprising: a front tooth extending from the tooth plane and defining a front height; and a middle tooth extending from the tooth plane and defining a middle height; wherein the front height is greater than the middle height; and a second gripper assembly comprising a plurality of grippers coupled to the first gripper assembly.

In yet another aspect, disclosed is a joint restraint, comprising: a housing; a gasket oriented within the housing and defining an axis; and a gripper assembly interposed between the gasket and the housing and defining an arcuate shape, the gripper assembly comprising a gripper defining a tooth plane, the gripper comprising: a front tooth extending from the tooth plane and defining a front height; and a middle tooth extending from the tooth plane and defining a middle height; wherein the front height is greater than the middle height.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

Various grippers have been developed for various applications, such as industrial automation, robotics, and material handling. Grippers typically comprise a body with one or more teeth or jaws used to grasp, hold, or manipulate objects. These teeth or jaws are designed to securely grip objects of various shapes and sizes, providing stability and control during handling operations. Grippers have been designed with teeth of uniform height along the tooth plane, providing a consistent gripping surface for objects. However, this design may not be optimal for gripping objects with irregular shapes or varying thicknesses, as the uniform height of the teeth may not provide sufficient contact or pressure to hold the object in place securely. Additionally, grippers with uniform-height teeth may not be as versatile in handling objects of different sizes and configurations.

Other gripper designs have incorporated teeth of varying heights along the tooth plane to address the limitations of uniform-height teeth. By adjusting the height of the teeth, these grippers can provide improved gripping performance for objects with non-uniform shapes or thicknesses. However, existing grippers with teeth of varying heights may still have limitations regarding overall gripping efficiency and adaptability to different object geometries. These grippers may not offer an optimal balance between gripping force and flexibility in handling various objects.

In summary, previous gripper designs have focused on providing a secure grip on objects with teeth of uniform height. While these designs have addressed certain limitations in gripping performance, these grippers do not offer a balanced combination of gripping force, adaptability to object shapes, and overall efficiency in handling objects of different sizes and configurations. However, none of the previous approaches have provided a comprehensive solution that combines the features described in this disclosure.

In one aspect, a toothed gripper with teeth of variable height and associated methods, systems, devices, and various apparatuses are disclosed herein. In one aspect, the toothed gripper can comprise an integral restraint system.

Figure 1:
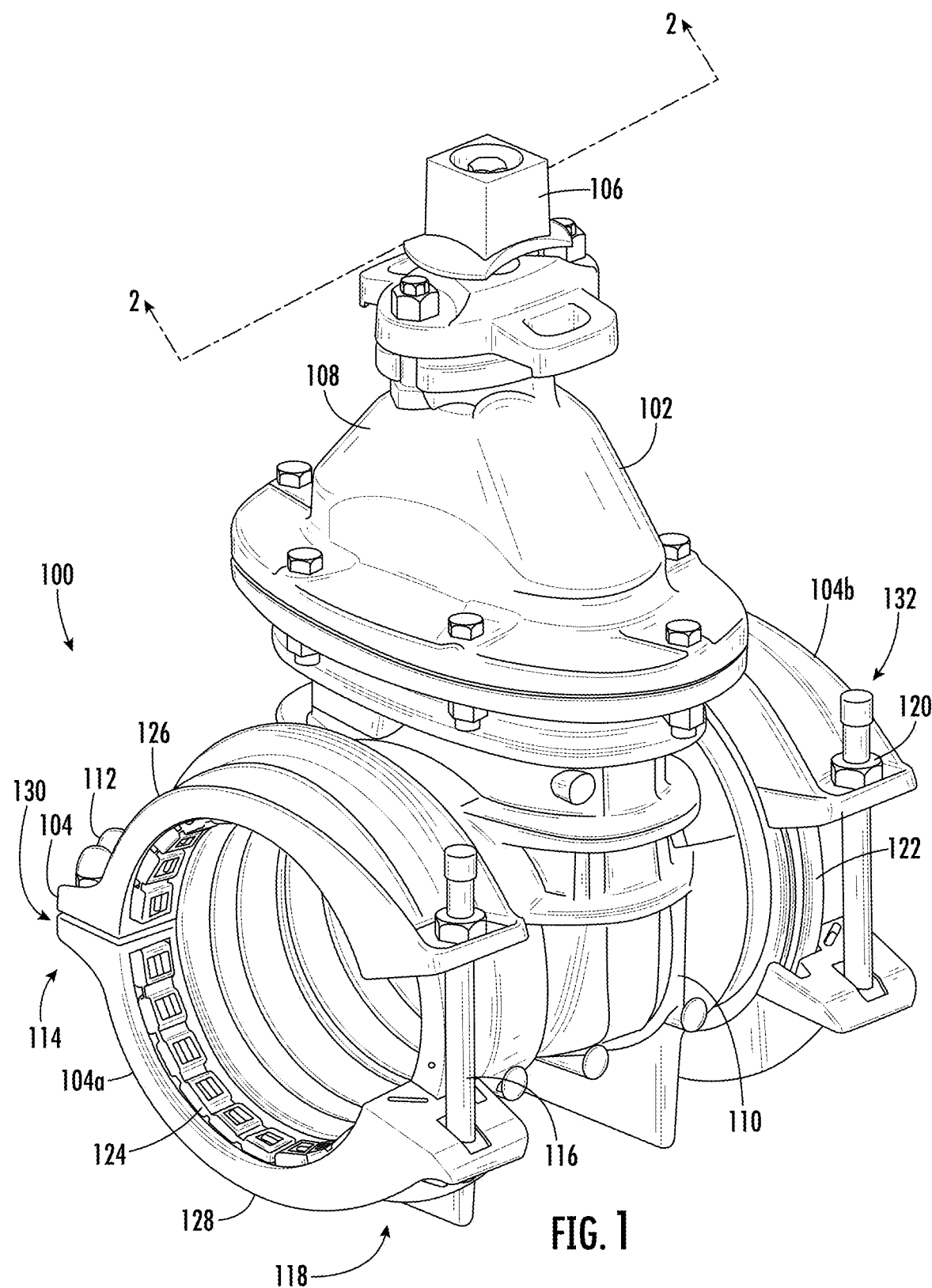
FIG. 1 is a perspective elevation view of a gate valve with a restraint system in accordance with one aspect of the current disclosure.

One aspect of a resilient wedge gate valve with an integral restraint system 100 is disclosed and described in FIG. 1. As will be appreciated, the restraint system 100 can be used on a gate valve 102, other valves, a fire hydrant, a coupling, and/or other axial pipe restraint components. The example provided with the gate valve 102 is exemplary only and should not be construed as limiting. Any piping component suited for a grip restraint 104 can utilize features of the restraint system 100 disclosed herein.

The gate valve 102 comprises an operating nut 106, a bonnet 108, and a valve body assembly 110, among other components housed within the valve body assembly 110, such as a gate and a stem that can be actuated by rotation of the operating nut 106. As illustrated on gate valve 102, an inlet grip restraint 104a and an outlet grip restraint 104b can be attached to the respective inlet 130 and outlet 132 of gate valve 102. Each grip restraint 104 can comprise a pivot 112 at a first end 114 and a fastener 116 at a second end 118. A nut 120 can be used on the fastener 116 to clamp down on the grip restraint 104. Specifically, grip restraint 104 can partially surround and clamp about a flange 122 of gate valve 102 to form a fluid-tight seal around an inserted pipe within a cavity 124 at the inlet and/or outlet of gate valve 102.

In some aspects, gate valve 102 can couple to grip restraint 104, and grip restraint 104 can comprise an upper portion 126 and a lower portion 128. That is, the fastener 116 couples the upper portion 126 to the lower portion 128 at the first end 114, and the fastener 116 couples the upper portion 126 to the lower portion at the second end 118 to form a seal between the gate valve 102, e.g., at the flange 122 of the gate valve 102, and a pipe inserted into the cavity 124 at the inlet 130 and/or outlet 132 of the gate valve 102.

Figure 2:
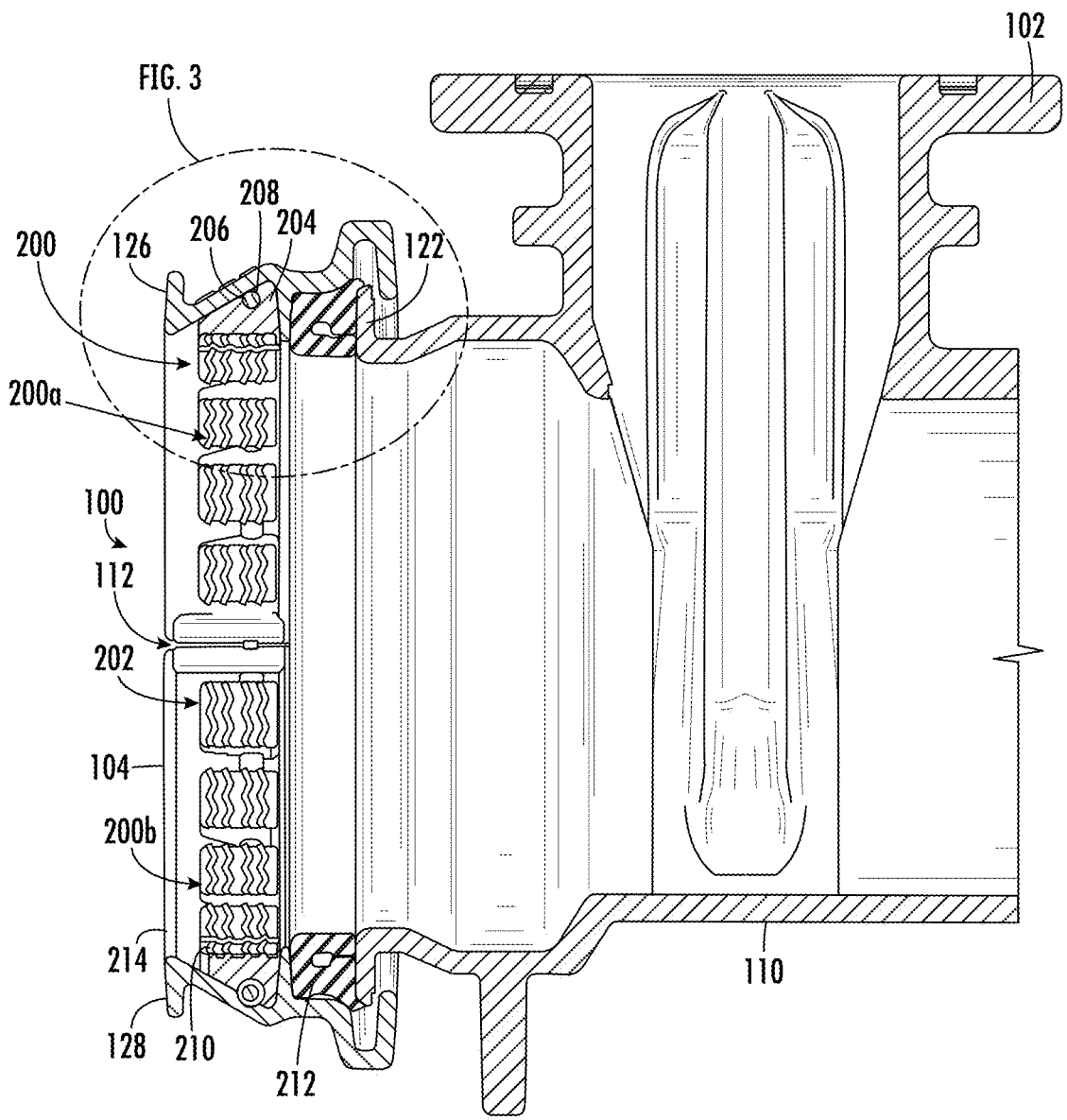
FIG. 2 is a cross-sectional view of the gate valve and restraint system of FIG. 1 taken along line 2-2.

As shown in FIG. 2, the restraint system 100 can comprise upper portion 126 and lower portion 128 coupled at pivot 112. Both the upper portion 126 and lower portion 128 can comprise gripper assemblies 200 comprising one or more grippers 202. For example, an upper gripper assembly 200a can be housed within upper portion 126, and a lower gripper assembly 200b can be housed within lower portion 128. Both the upper and lower gripper assemblies 200 can comprise a plurality of grippers 202 and can define a partial or complete arcuate shape. In some aspects, gripper assemblies 200 can be coupled to form an annular ring, as shown. Each gripper 202 can define an angled or tapered body 204 defining an angled surface (e.g., gripper 202 defines a tapered surface extending from the front to the back of the gripper 202) and comprising a ring bore or through-hole 206 that is intersected with a cable 208 extending through the through-hole 206. Each gripper 202 can also comprise one or more teeth 210 extending across a width on one side of the tapered body 204.

In various aspects, the gripper 202 and cable 208 can be fabricated from a ferrous metal, such as a steel alloy, stainless steel, or other steel. Other suitable materials can comprise a titanium alloy, an aluminum alloy, and/or a bronze alloy. Grippers 202 can also be fabricated from a composite material, such as carbon fiber, fiberglass, and/or HDPE, based on the desired use of the gripper assembly 200 and what material the gripper 202 is likely to engage in the field.

Additionally, flange 122 of the valve body assembly 110 can capture one or more gaskets 212, within the restraint system 100 between the grippers 202 and the flange 122. An outer rim 214 of the grip restraint 104 is configured to engage and form a first water-tight seal, and the gripper assemblies 200 with the plurality of grippers 202 are joined to encircle the inserted pipe. The gripper assemblies 200 hold the pipe relative to the valve body assembly 110 to ensure that one or more gaskets 212 form an unobstructed water-tight seal that adequately retains the pipe.

Figure 3:
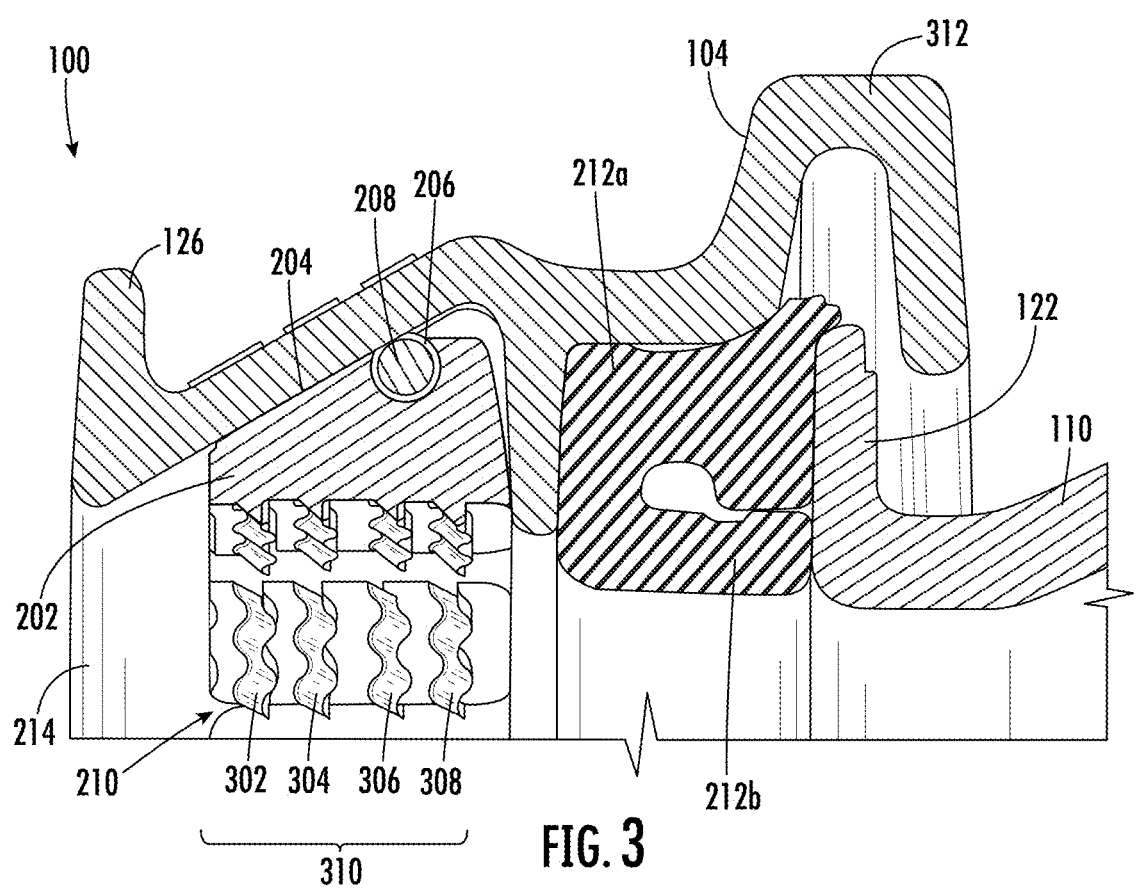
FIG. 3 is a detailed view of the restraint system of FIG. 2 taken from detail 3.

FIG. 3 shows the detailed view 3 encircled in FIG. 2. Tapered body 204 can comprise various-sized teeth 210, for example, front tooth 302, forward middle tooth 304, rear middle tooth 306, and rear tooth 308. In other aspects, one or more series of teeth 210 and/or each tooth (e.g., front tooth 302, forward middle tooth 304, rear middle tooth 306, and/or rear tooth 308) can comprise a series of teeth that extend laterally across the gripper 202. Front teeth 210, forward-middle teeth 210, rear-middle teeth 210, and/or rear teeth 210 can all comprise different sizes, dimensions, and/or features that facilitate a wave pattern 310 of teeth 210.

FIG. 3 illustrates that one or more gaskets 212 can comprise an upper seal 212a and a lower seal 212b. An upper portion of seal 212 (e.g., upper seal 212a) and a lower portion of seal 212 (e.g., lower seal 212b) can define an upstream cavity between the upper seal 212a and the lower seal 212b to use fluid pressure of fluids, such as water, within the pipe to hold the seal 212 in place and ensure a fluid-tight seal 212 even if the pipe or other piping component moves relative to the valve 102. Grip restraint 104 can also comprise a receptor 312 that receives a portion of flange 122 to capture and partially surround the inlet 130 and/or outlet 132 of valve body assembly 110. The gasket 212 can compress against pivot 112, and pivot 112 can be received in receptor 312 to form a water-tight seal around the pipe or other piping component.

Figure 4:
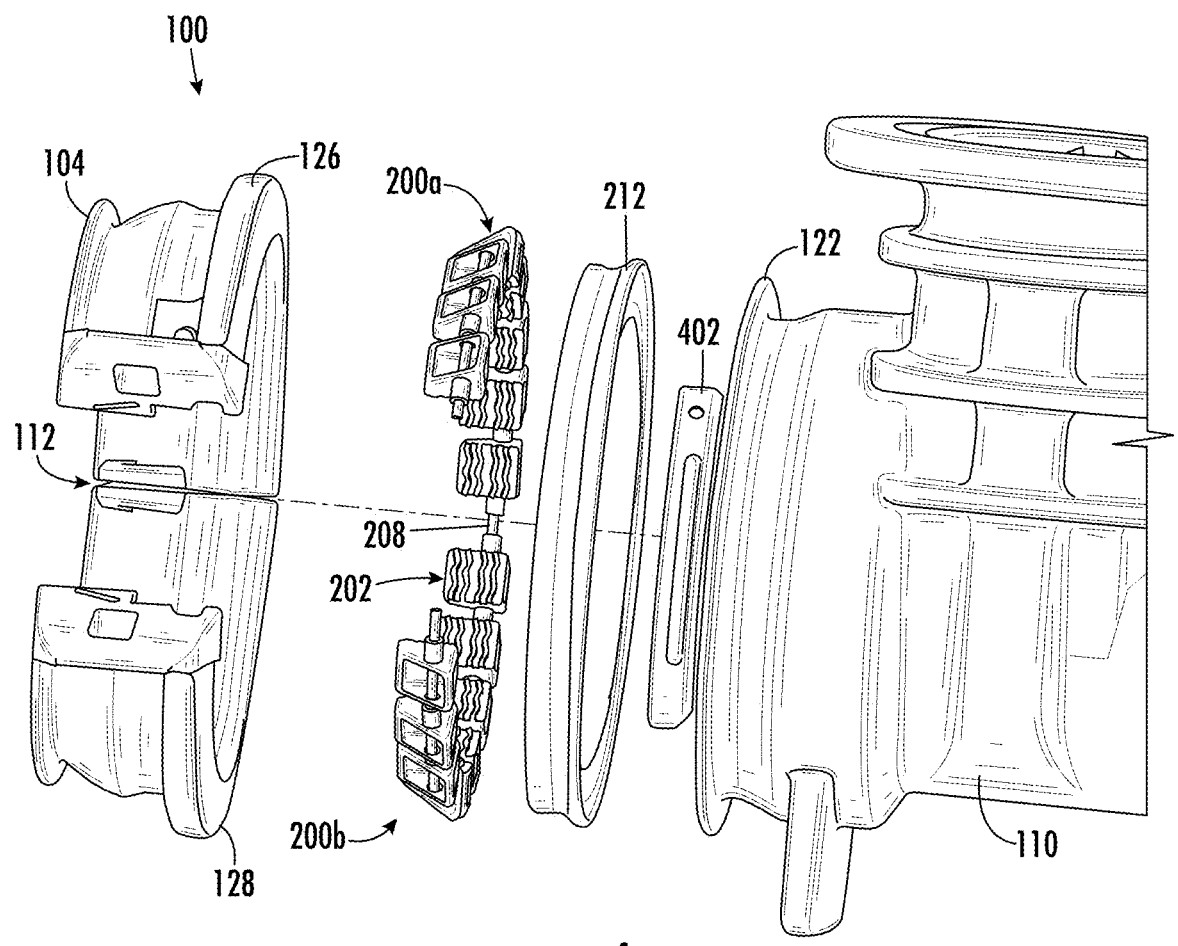
FIG. 4 is an exploded view of the gate valve and restraint system of FIG. 1.

FIG. 4 is an exploded view of the gate valve 102 and restraint system 100. Grip restraint 104 is coupled at pivot 112, and the upper gripper assembly 200a and lower gripper assembly 200b are shown adjacent to the upper portion 126 and the lower portion 128, respectively. An individual gripper 202 can be coupled to cable 208, as shown, which extends through both gripper assemblies 200. Gripper assemblies 200 and gasket 212 are disposed within restraint system 100 and at least partially surround and/or capture flange 122 of 110. In some aspects, a gasket bridge 402 extends between upper portion 126 and lower portion 128 of housing to support gasket 212 and prevent gasket 212 from being pushed outwards, e.g., toward fastener 116.

Figure 5:
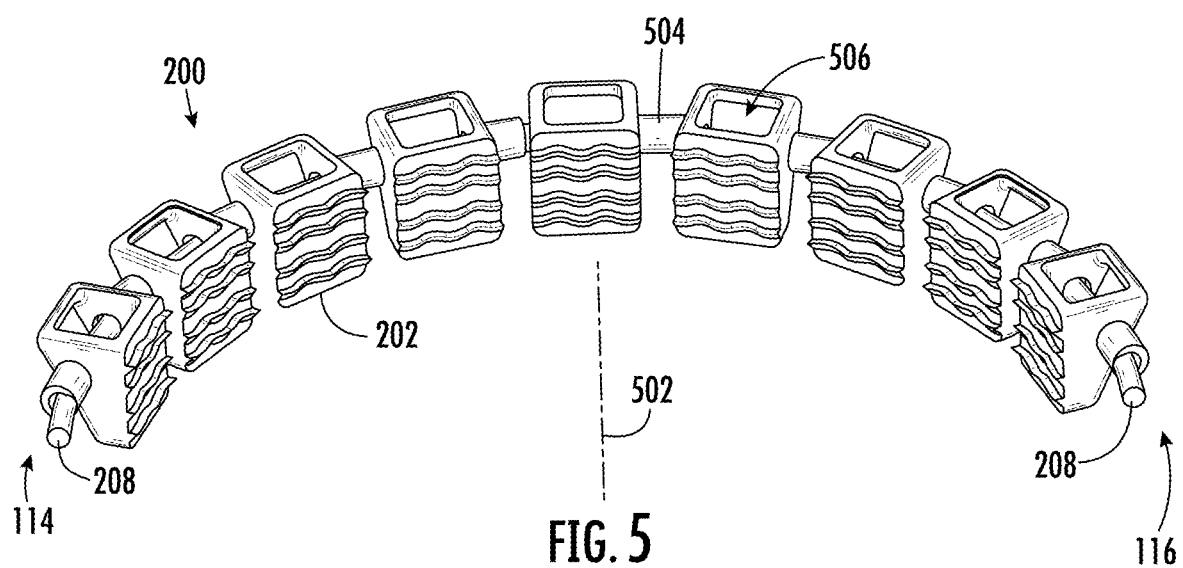
FIG. 5 is an isolated elevation view of the gripper assembly.

FIG. 5 is an isolated elevation view of the gripper assembly 200. As shown, gripper assemblies 200 extends from the first end 114 to the second end 118, and cable 208 runs through grippers 202 of gripper assemblies 200. The gripper assemblies 200 can extend around a circular arc, e.g., about a central axis 502, and various spacers 504 can be interposed between two adjacent grippers 202. The spacers 504 can be interposed between a first gripper 202 and a second gripper 202 to separate the grippers 202 of the gripper assembly 200 about a circular arc. In the aspect shown, gripper 202 can define a concavity 506, which reduces weight and/or increases the flexibility of gripper 202. In some aspects, spacer 504 can comprise a rubber or elastomeric material. For example, spacer 504 can be a rubber washer configured to orient and/or space adjacent grippers 202 relative to one another.

Figure 6:
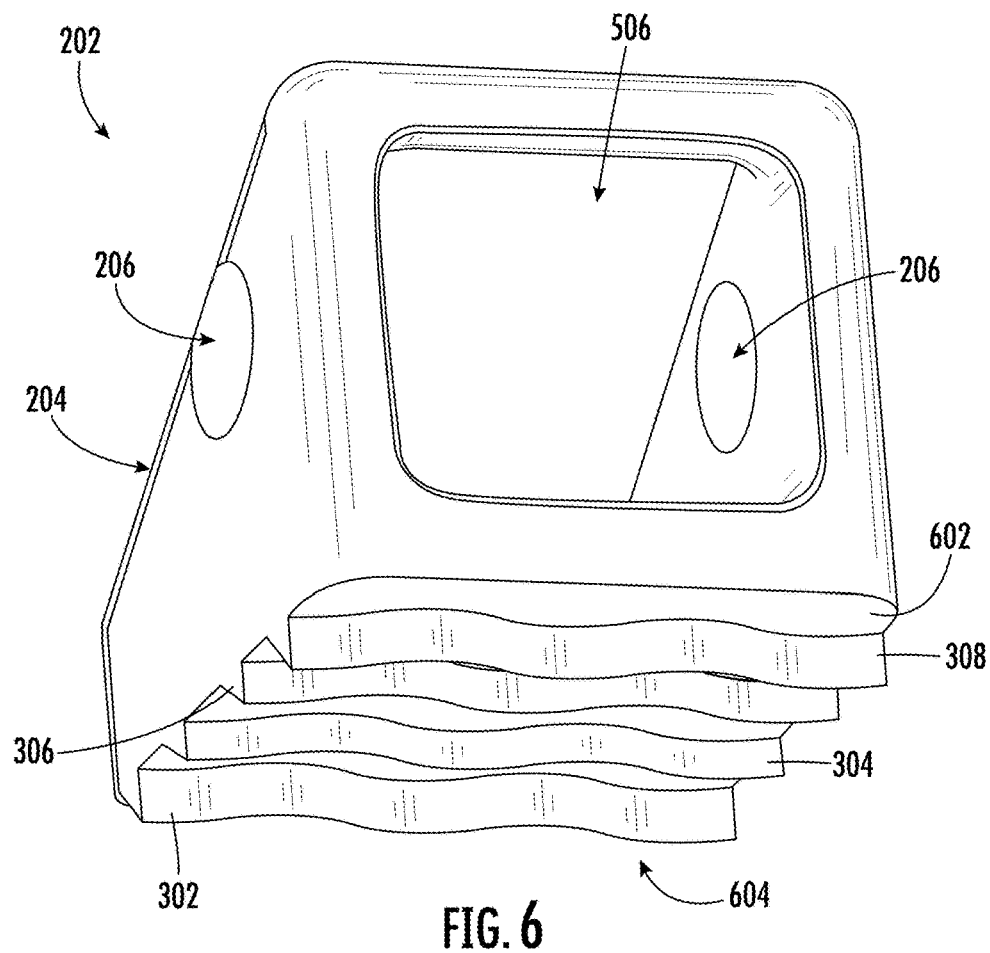
FIG. 6 is a rear perspective view of a gripper.

FIG. 6 is a rear perspective view of a gripper 202 comprising tapered body 204 and the through-hole 206. In the present aspect, through-hole 206 comprises two through-holes 206 that extend through either side of concavity 506, as illustrated. In other aspects, through-hole 206 can be a single hole that extends through a solid upper portion of the gripper 202 and/or solid gripper 202 without concavity 506. Concavity 506 extends through a central portion of gripper 202, and various teeth 210 are disposed along and extending from a tooth plane 602. As illustrated, the teeth 210 can define a wave pattern 310 along the tooth plane 602. Gripper 202 can comprise an inner surface 604 that defines the tooth plane 602. The tooth plane 602 and/or inner surface 604 can provide a functional grip of the gripper 202. The grippers 202 can hold the joint against the pipe and prevent the pipe from being removed.

The front tooth 302 extend at the narrowest portion of the tapered body 204, and the rear tooth 308 extend from the tooth plane 602 at the thickest part of the tapered body 204. Rear middle tooth 306 and/or rear tooth 308 extend from tooth plane 602 between front tooth 302 and rear tooth 308. In various aspects, the front tooth 302 and/or rear tooth 308 define an equal or similar height greater than the height of forward middle tooth 304 and/or rear middle tooth 306. Forward middle tooth 304 and/or rear middle tooth 306 can define the same or similar height. For example, the front height can be at least 0.02-0.03 inches greater than the middle height. In some aspects, the front height can be at least 15-20% greater than the middle height. In a specific aspect, the front height can be between 0.07-0.08 inches, and the middle height can be between 0.05-0.06 inches. In various aspects, the height of front tooth 302 can be greater than the height of middle tooth 304 and/or middle tooth 306. For example, the height of the front tooth 302 can be 15% or more than the height of the middle tooth 304 to enhance the gripping performance of the gripper 202.

Figure 7:
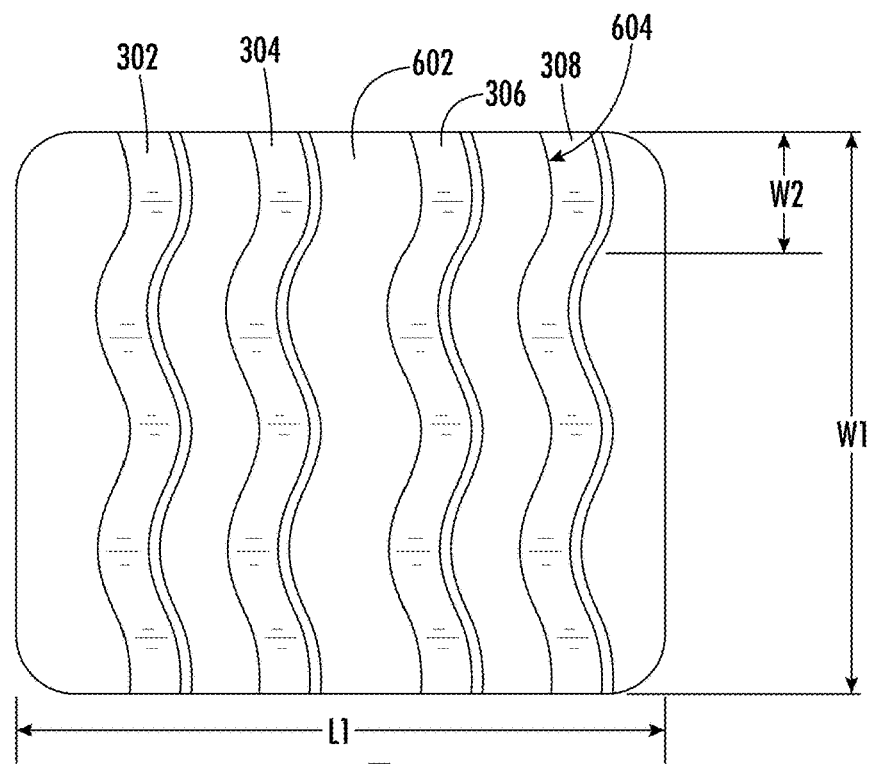
FIG. 7 is a bottom view of the gripper of FIG. 6, showing features of the teeth along the width and length of the tooth plane of the gripper.

FIG. 7 is a bottom view of the gripper 202 showing features of the teeth 210 along a width W1 and a length L1 of the tooth plane 602 of the gripper 202 shown in FIG. 6. The width W2 of one period of wave pattern 310 on the inner surface 604 can repeat along the tooth plane 602 and can vary across the length L1 and/or width W1 of the teeth 210. In various aspects, the gripper 202 can comprise at least one of the front tooth 302, front middle tooth 304, rear middle tooth 306, and rear tooth 308 with a tooth width W1 between 0.05 in. and 0.1 in.

Figure 8:
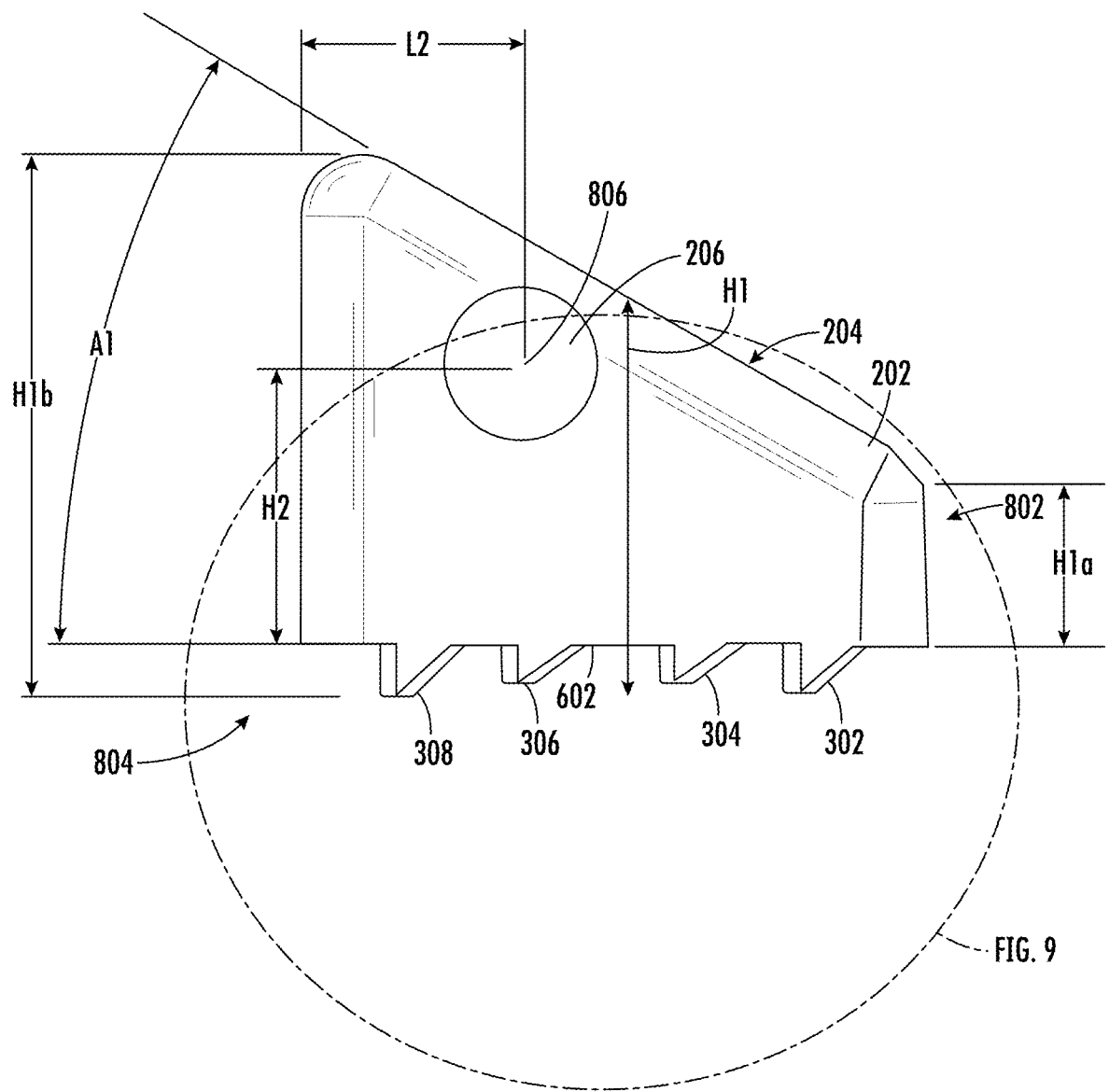
FIG. 8 is a side perspective view of the gripper of FIG. 6.

FIG. 8 is a side perspective view of the gripper 202 of FIG. 6 extending from a front end 802 to a back end 804 of the gripper 202. As illustrated, a height H1 can vary along an angle A1 of tapered body 204. Height H1 can be measured from the front end 802 at a height H1a to the back end 804 height H1b of gripper 202. The height H1 of the gripper 202 can change from front end 802 to back end 804 and defines a minimum value H1a at front end 802 and a maximum valve H1b at back end 804. A height H2 and length L2 of a center 806 of through-hole 206 can be located above front end 802 and behind front tooth 302, forward middle tooth 304, and/or rear middle tooth 306. The center 806 is measured from the surface at the back end 804 and from the tooth plane 602. Center 806 can be located closer to the back end 804 than the front end 802 and/or can be located between a midpoint between front end 802 and back end 804 and back end 804. Similarly, center 806 can be located closer to tapered body 204 than the tooth plane 602.

Figure 9:
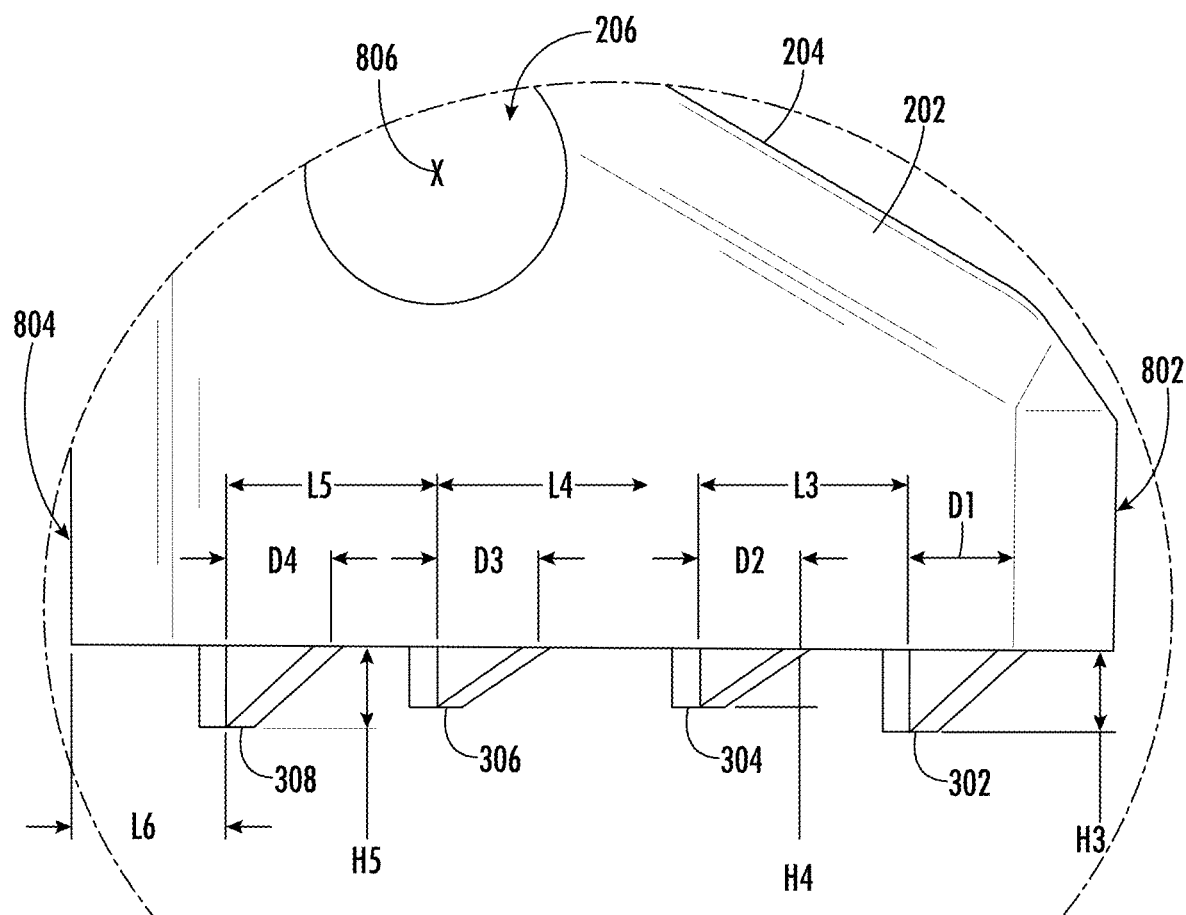
FIG. 9 is a detailed view of the gripper, as shown in FIG. 8, taken from detail 9.

FIG. 9 is a detailed view of the gripper 202 in FIG. 8 taken from detail 9. As illustrated, a height H3 of front tooth 302 can be greater than a height H4 of forward middle tooth 304 and/or rear middle tooth 306. Similarly, height H3 of front tooth 302 can be the same as or similar to height H5 of rear tooth 308. Similarly, a distance D1 of front tooth 302 can be greater than a distance D2 and/or D3 of forward middle tooth 304 and/or rear middle tooth 306, respectively. Stated differently, distance D1 defines a base thickness of the front tooth 302, distance D2 defines the base thickness of the front middle tooth 304, distance D3 defines the base thickness of the rear middle tooth 306, and distance D4 defines the base thickness of the rear tooth 308. The base thickness, e.g., distance D2, of the front middle tooth 304 can be equal to the base thickness, e.g., distance D3, of the rear middle tooth 306.

In some aspects, the distance D1 can be equal to or similar to D4 of rear tooth 308. In this way, a length L3 between the end of front tooth 302 to the end of forward middle tooth 304 is the same or similar to a length L5 from rear tooth 308 to rear middle tooth 306. Similarly, a spacing length L4 between forward middle tooth 304 to rear middle tooth 306 can be greater than the lengths L3 and/or L5.

In various aspects, the orientation of the center 806 of through-hole 206 and the position of front tooth 302, forward middle tooth 304, rear middle tooth 306, and/or rear tooth 308 can enhance the integral restraint system 100 that comprises a tall tooth in front and back and two short teeth 210 between the tall rear tooth. The teeth 210 (e.g., front tooth 302, forward middle tooth 304, rear middle tooth 306, and/or rear tooth 308) can comprise wave pattern 310 to form a radius of curvature that follows the texture generally seen on a pipe. The wave pattern 310 can be configured to align approximately parallel with an outer surface circumference on a pipe. For example, wave pattern 310 on the teeth 210 can be designed to fit an outer diameter on a ductile iron pipe, HDPE pipe, and/or another piping component. In some aspects, wave pattern 310 can define a unit radius of between 0.15-0.20 inches to facilitate the alignment of wave pattern 310 with the outer diameter of the surface of the pipe. The unit radius can oscillate first in one direction and then in the other direction to define an oscillating unit radius, e.g., between 0.15-0.20 inches. The wave pattern 310 can facilitate teeth 210 texture following the pipe's outer diameter or another fitting. Wave pattern 310 can increase the restraint frictional fit at the gripper 202 under high working pressures and/or wet environments.

In various aspects, wave pattern 310 can define a catchable area or area that rests on the outer surface of the pipe when valve 102 is engaged with the pipe or other piping components. The catchable area is defined as the height and width of the tooth. For example, the front tooth 302, middle tooth 304, 306, and/or back teeth can define a catchable area (e.g., the tooth defines a height and width that engages a pipe) of at least 0.2 inches squared.

The description is provided to enable teaching of the present devices, systems, and/or methods in their best, currently known aspect. To this end, those skilled in the relevant art will recognize and appreciate that many changes can be made to the various aspects described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible, can even be desirable in certain circumstances, and are part of the present disclosure. Thus, the following description is provided as illustrative of the principles of the present disclosure and not in limitation thereof.

As used throughout, the singular forms "a," "an," and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials and processes and between different models, the tolerance for a particular measurement of a particular component can fall within a range of tolerances.

As used herein, the terms "optional" or "optionally" mean that the subsequently described event or circumstance may or may not occur and that the description comprises instances where said event or circumstance occurs and instances where it does not.

The word "or" as used herein means any one member of a particular list and also comprises any combination of members of that list. The phrase "at least one of A and B," as used herein, means "only A, only B, or both A and B," while the phrase "one of A and B" means "A or B."

As used herein, unless the context clearly dictates otherwise, the term "monolithic" in the description of a component means that the component is formed as a singular component that constitutes a single material without joints or seams.

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes the end of the seat nearest to and occupied by a user of a seat; "rear" is that end of the seat that is opposite or distal the front; "left" is that which is to the left of or facing left from a person sitting in the seat and facing towards the front; and "right" is that which is to the right of or facing right from that same person while sitting in the seat and facing towards the front. "Horizontal" or "horizontal orientation" describes that which is in a plane extending from left to right and aligned with the horizon. "Vertical" or "vertical orientation" describes that which is in a plane that is tapered at 90 degrees to the horizontal.

One should note that conditional language, such as, among others, "can," "could," "might," or "may," unless expressly stated otherwise or otherwise understood within the context as used, is generally intended to convey that certain aspects include, while other aspects do not include, specific features, elements and/or steps. Thus, such conditional language is not generally intended to imply that features, elements, and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code that comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:
1. A gripper, comprising:
   a gripper body defining an inner surface that defines a tooth plane;
   a front tooth extending from the tooth plane and defining a front height;
   a middle tooth extending from the tooth plane and defining a middle height; and a back tooth extending from the tooth plane and defining a back height, wherein the front height equals the back height and the middle height is less than either the front height or the back height, wherein the front height is between 0.07 inches and 0.08 inches, and the middle height is between 0.05 inches and 0.06 inches.

2. The gripper of claim 1, wherein at least one of the front tooth, the middle tooth, and the back tooth defines a maximum tooth width of 0.2 inches.

3. The gripper of claim 1, wherein the front height is at least 0.02 inches greater than the middle height.

4. The gripper of claim 1, wherein the front height is at least 15% greater than the middle height.

5. The gripper of claim 1, wherein the middle tooth is a first middle tooth defining the middle height, the gripper further comprising a second middle tooth between the front tooth and the back tooth and the second middle tooth defines a height equal to the middle height.

6. The gripper of claim 1, wherein at least one of the front tooth, the middle tooth, and the back tooth comprises a wave pattern.

7. The gripper of claim 6, wherein the wave pattern is configured to align approximately parallel with a circumference of a pipe.

8. The gripper of claim 6, wherein the wave pattern has a unit radius of between 0.15 in and 0.20 in.

9. The gripper of claim 6, wherein at least one of the front tooth, the middle tooth, and the back tooth comprises a catchable area of at least 0.2 in$^2$.

10. A gripper assembly, comprising:
a first gripper assembly comprising a plurality of grippers, each gripper comprising a gripper body defining a tooth plane and comprising:
a front tooth extending from the tooth plane and defining a front height; and
a middle tooth extending from the tooth plane and defining a middle height; wherein the front height is greater than the middle height; and
a second gripper assembly comprising a plurality of grippers coupled to the first gripper assembly.

11. The gripper assembly of claim 10, wherein the first gripper assembly and the second gripper assembly are coupled to form a portion of an annular ring that extends about and at least partially surrounds an outer diameter of a pipe.

12. The gripper assembly of claim 10, further comprising a back tooth extending from the tooth plane and defining a back height, wherein the back height is greater than the middle height.

13. The gripper assembly of claim 10, wherein the first gripper assembly comprises a first cable and the second gripper assembly comprises a second cable, and wherein each gripper in the first gripper assembly comprises a tapered surface, wherein the front tooth, the middle tooth, and a back tooth are compressed by the tapered surface, and wherein the second cable couples the plurality of grippers in the second gripper assembly.

14. The gripper assembly of claim 10, further comprising a first cable coupling the plurality of grippers in the first gripper assembly, and a second cable coupling the plurality of grippers in the second gripper assembly.

15. The gripper assembly of claim 14, wherein the first cable is a steel cable, and the gripper assembly further comprises rubber washers positioned between each gripper body on the steel cable to space the plurality of grippers.

16. A joint restraint, comprising:
a housing;
a gasket oriented within the housing and defining an axis; and
a gripper assembly interposed between the gasket and the housing and defining an arcuate shape, the gripper assembly comprising a gripper defining a tooth plane, the gripper comprising:
a front tooth extending from the tooth plane and defining a front height; and
a middle tooth extending from the tooth plane and defining a middle height;
wherein the front height is greater than the middle height.

17. The joint restraint of claim 16, wherein the joint restraint extends around the axis and comprises a wave pattern, wherein the wave pattern comprises an oscillating unit radius of between 0.15 in and 0.20 in.

18. The joint restraint of claim 16, wherein the gripper assembly further comprises a cable and each gripper comprises a tapered surface and a ring bore, wherein the tapered surface is compressed by one of the gasket and the housing of the joint restraint; and wherein the ring bore receives the cable.

19. The joint restraint of claim 16, wherein the gasket further comprises an upper portion and a lower portion with an upstream cavity between the upper portion and the lower portion.

* * * * *